United States Patent
Iisaka et al.

(10) Patent No.: US 6,366,221 B1
(45) Date of Patent: Apr. 2, 2002

(54) RENDERING DEVICE

(75) Inventors: Atsushi Iisaka, Katano; Nobuhiko Yasui, Moriguchi; Akira Ishida, Sakai; Takashi Yoshida, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/892,744

(22) Filed: Jun. 28, 2001

(30) Foreign Application Priority Data

Jun. 30, 2000 (JP) ............................................. 12-199516

(51) Int. Cl.$^7$ ................................................. B60Q 1/48
(52) U.S. Cl. ..................... 340/932.2; 340/461; 180/204; 348/119; 348/148; 701/41
(58) Field of Search ............................. 340/932.2, 903, 340/435, 436, 461, 525; 348/115, 118, 119, 121, 135, 148, 149; 701/23, 25, 41; 180/204, 168, 446

(56) References Cited

U.S. PATENT DOCUMENTS

| | | | |
|---|---|---|---|
| 5,742,141 A | * | 4/1998 | Czekaj ........................ 318/587 |
| 6,059,063 A | * | 5/2000 | Shimizu et al. ............. 180/204 |
| 6,172,601 B1 | * | 1/2001 | Wada et al. ................. 340/436 |
| 6,212,452 B1 | * | 4/2001 | Shimizu et al. ............... 701/41 |
| 6,222,447 B1 | * | 4/2001 | Schofield et al. ........... 340/461 |

FOREIGN PATENT DOCUMENTS

| | | |
|---|---|---|
| JP | 64-14700 | 1/1969 |
| JP | 7-195978 | 8/1995 |
| JP | 7-223487 | 8/1995 |
| JP | 8-048198 | 2/1996 |
| JP | 10-117340 | 5/1998 |
| JP | 11-78692 | 3/1999 |

* cited by examiner

*Primary Examiner*—Edward Lefkowitz
*Assistant Examiner*—Davetta W. Goins
(74) *Attorney, Agent, or Firm*—Wenderoth, Lind & Ponack, L.L.P.

(57) ABSTRACT

In a rendering device 10, ROM 4 stores a vehicle model. A rudder angle sensor 3 detects a rudder angle of the vehicle, and based thereon, CPU 6 calculates an estimated path for the vehicle. The CPU 6 receives captured images from cameras $2_1$ to $2_N$. The CPU 6 generates a display image based on those captured images, the estimated path, and the vehicle model. This display image includes the vehicle model arranged on the estimated path, and displayed on a display device 8 placed in the vehicle. In this manner, the display image generated by the rendering device 10 is indicative and helpful for a driver of the vehicle to exactly figure out a parking space available for the vehicle.

10 Claims, 6 Drawing Sheets

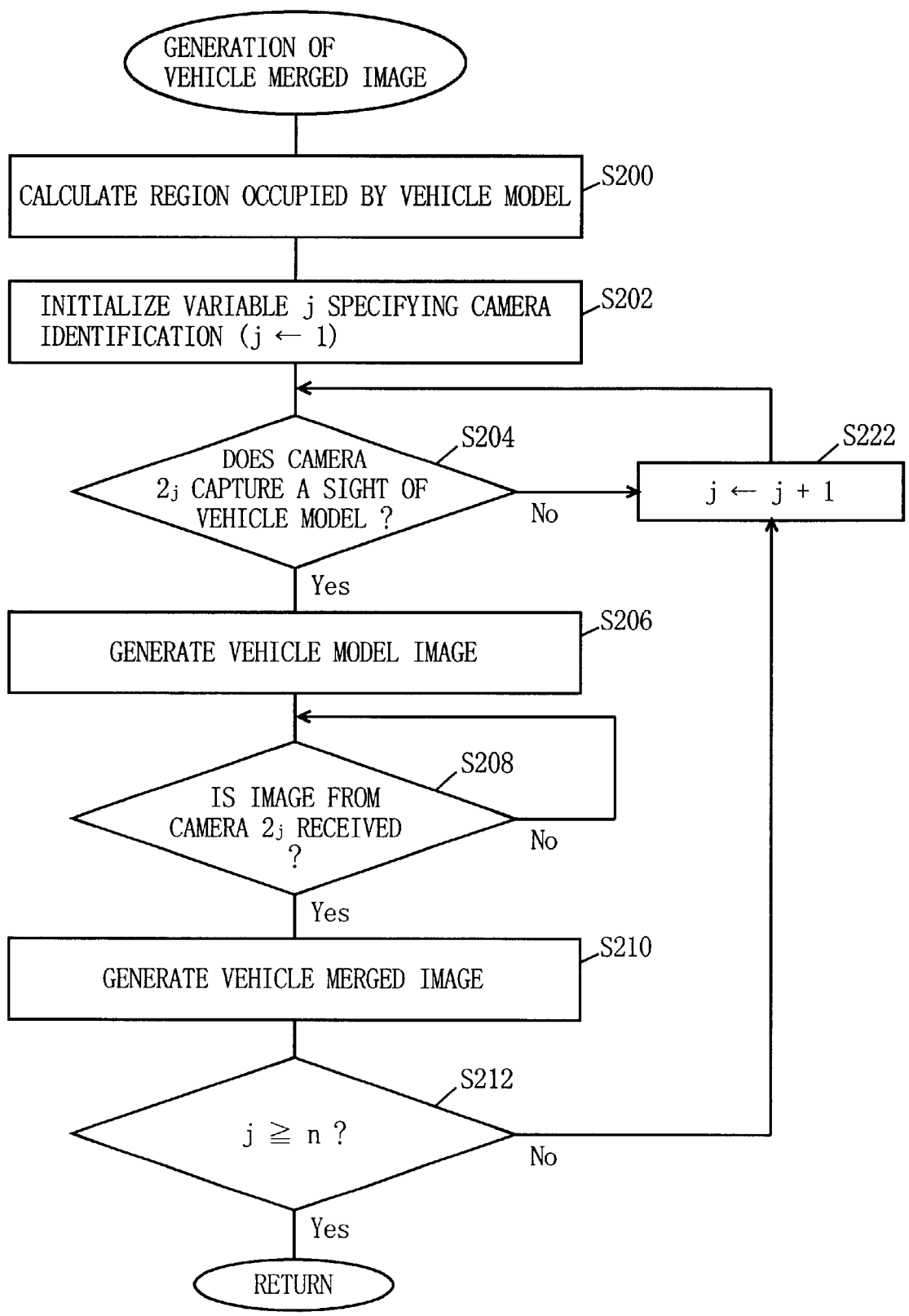

RENDERING DEVICE

BACKGROUND OF THE INVENTION

1. Field of the Invention

The present invention relates to rendering devices and, more specifically, to a rendering device which can be incorporated in a drive assistant device. In more detail, the rendering device generates a display image of around a vehicle based on an image captured by an image capture devices fixedly placed in the vehicle.

2. Description of the Background Art

A conventional drive assistant system is exemplarily disclosed in Japanese Patent Laid-Open Publication No. 64-14700 (1989–14700). The drive assistant system is provided with a rudder angle sensor placed in a vehicle for detecting a rudder angle of the steering wheel; a processor for deriving, based on the rudder angle of the steering wheel, a path estimated for the vehicle to take; an image capture device in charge of an area rear, or right and left-side rear of the vehicle; and a display device for displaying a display image. In such drive assistant system, when the vehicle starts moving backward, the display device displays an image captured by the image capture device to show the driver in what state the area behind the vehicle is. When the steering wheel is turned, a path estimated for the vehicle to take is overlaid on the same image. Here, the estimated path is derived based on the rudder angle of the steering wheel. With the help of such image provided by the drive assistant device, the driver can know whether his/her current steering will fit the vehicle into the parking space.

There is another type of conventional drive assistant device exemplarily disclosed in Japanese Patent Laid-Open Publication No. 11-78692 (99-78692). The drive assistant device carries a plurality of image capture devices, and merges plural images captured thereby to generate a display image. For higher speed image merging, every pixel in each of those captured images is mapped to a road surface whereon the vehicle moves. Then, the road surface is viewed from a predetermined virtual viewpoint, and the resulting display image covers the area around the vehicle. In this case, any object observed around the vehicle is projected on the road surface without any height component.

The above conventional type drive assistant devices carry problems as follows.

First, such drive assistant devices are not helpful enough if the parking lot has no marking as white lines defining an individual parking space. The driver thus finds it difficult to exactly figure out where to park in such parking lot.

Second, especially in the conventional drive assistant device of a type merging a plurality of images and generating a display image, no concern is given to the height components of objects appearing in the captured images. As a result, objects in the resulting display image look deformed. It means, assuming that the driver wants to park his/her vehicle between two vehicles positioned behind, as shown in FIG. 7, the resulting display image shows the driver two deformed two vehicles. The driver thus has a hard time to precisely recognize a space between those two vehicle available for his/her vehicle, for example. In such case, an estimated path L is of little help. In other words, with the conventional drive assistant devices, the driver finds it difficult to decide if his/her vehicle fits in the parking space without hitting anything.

SUMMARY OF THE INVENTION

Therefore, an object of the present invention is to provide a rendering device, a display image generated thereby being supportive enough for a driver of the vehicle to figure out a parking space available for his/her vehicle. Another object of the present invention is to provide a rendering device, a display image generated thereby being indicative and helpful enough for the driver to decide whether his/her vehicle fits into the parking space without hitting anything.

The present invention has the following features to attain the objects above.

An aspect of the present invention is directed to a rendering device for generating a display image of around a vehicle for drive assistance, and the device comprises a vehicle model storage part for storing a vehicle model representing the vehicle; a path calculating part for calculating an estimated path for the vehicle based on a rudder angle of the vehicle provided by a rudder angle detecting part placed in the vehicle; a receiving part for receiving a captured image of around the vehicle from an image capturing part placed in the vehicle; and an image processing part for generating the display image based on the captured image, the estimated path, and the vehicle model. The display image generated by the image processing part is displayed by a display part placed in the vehicle, and includes the vehicle model arranged on the estimated path.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart showing the procedure to generate a vehicle overlaid image in the embodiment;

DESCRIPTION OF THE PREFERRED EMBODIMENT

By referring to the accompanying drawings, one embodiment of the present invention is described below.

Figure 1:
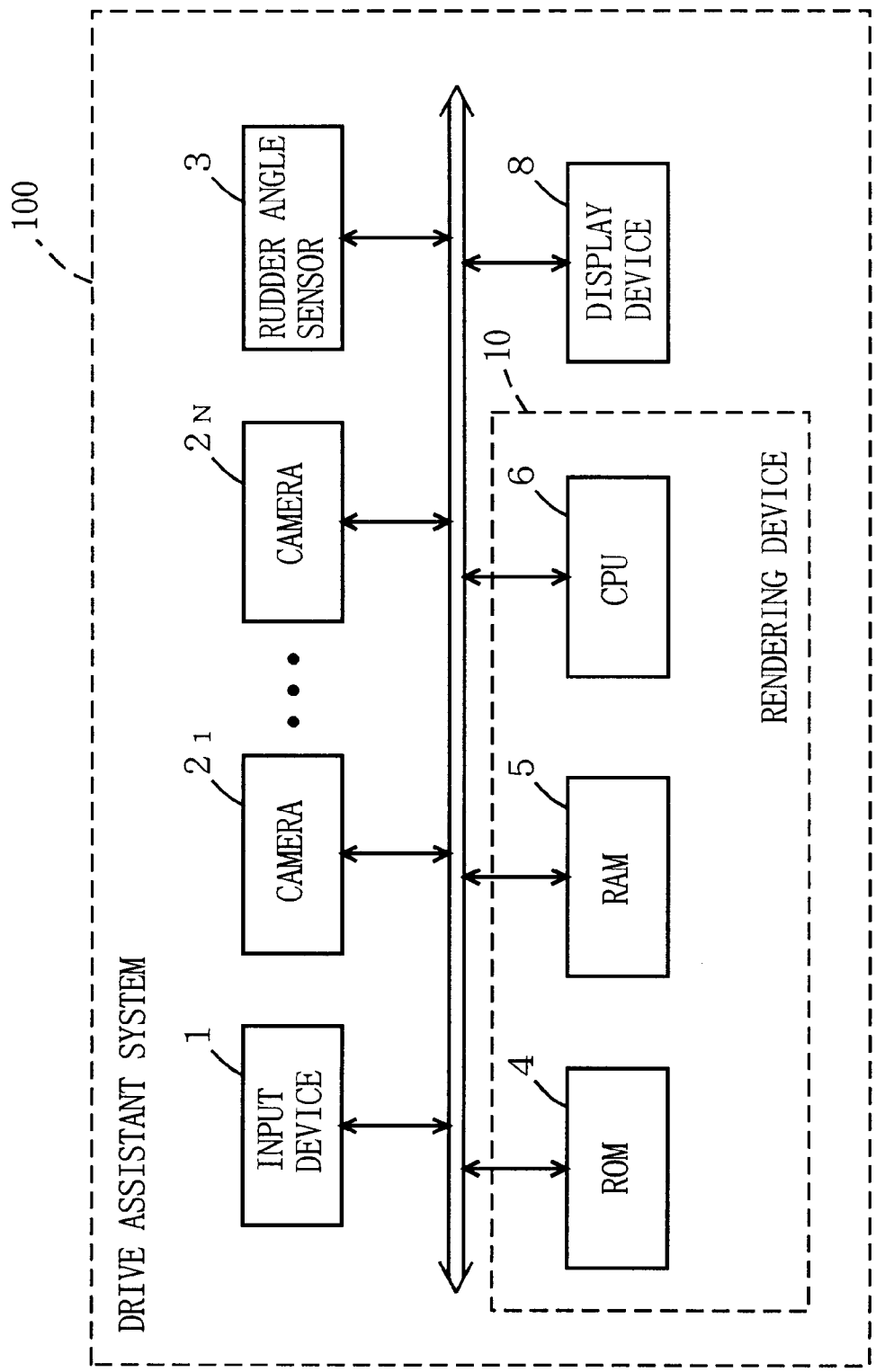
FIG. 1 is a block diagram showing the hardware structure of a drive assistant device according to one embodiment of the present invention.

FIG. 1 is a block diagram showing the hardware structure of a drive assistant system 100 according to the embodiment of the present invention. The drive assistant system 100 includes an input device 1, N (where N is a natural number equal to 1 or larger) cameras $2_1$ to $2_N$ a rudder angle sensor 3, a rendering device 10, and a display device 8. The rendering device 10 here includes ROM 4, RAM 5, and a CPU 6.

The input device 1 is found in a position where a driver of the vehicle is easy to operate, and composed of a remote controller, a touch panel, an operation button, and the like.

The cameras $2_1$ to $2_N$ are fixedly placed in each different predetermined position in the vehicle, and have charge of capturing images of around the vehicle. The cameras $2_1$ to $2_N$ are each assigned an identification value, and identified thereby. For convenience, the identification values in this embodiment are the numerical subscripts accompanying the reference numeral 2 of the cameras.

The rudder angle sensor 3 is also placed in a predetermined position in the vehicle, and detects the rudder angle of the steering wheel.

The CPU 6 runs following a program in the ROM 4, and thereby functions as path calculating means and image processing means, and generates a display image (these expressions appear in Claims). During this execution, the RAM 5 is used as a working area for the CPU 6. In the RAM 5, a region (hereinafter, referred to as a frame buffer) is reserved for each of the cameras $2_1$ to $2_N$ for storing a frame of the images captured thereby. In the RAM 5, frame memory is also reserved as a region wherein the display image is generated by the CPU 6.

The ROM 4 stores data representing a three-dimensional model of the vehicle. Here, the vehicle model is equivalent in size to the actual vehicle. To make sure that the vehicle does not hit any other vehicle in a close range, for example, the vehicle model may be somewhat bigger than the actual vehicle.

The display device 8 is typically a liquid crystal display, and displays the display image generated by the CPU 6.

Such structured system 100 is typically found useful by the driver when he/she moves the vehicle backward to park between other vehicles behind. When needing the assistant offerable by the present system 100, the driver operates the input device 1.

In response to the driver's operation, the input device 1 instructs the CPU 6 to execute the program. The CPU 6 then starts going through such procedure as shown in FIG. 2 in accordance with the program in the ROM 4.

Figure 2:
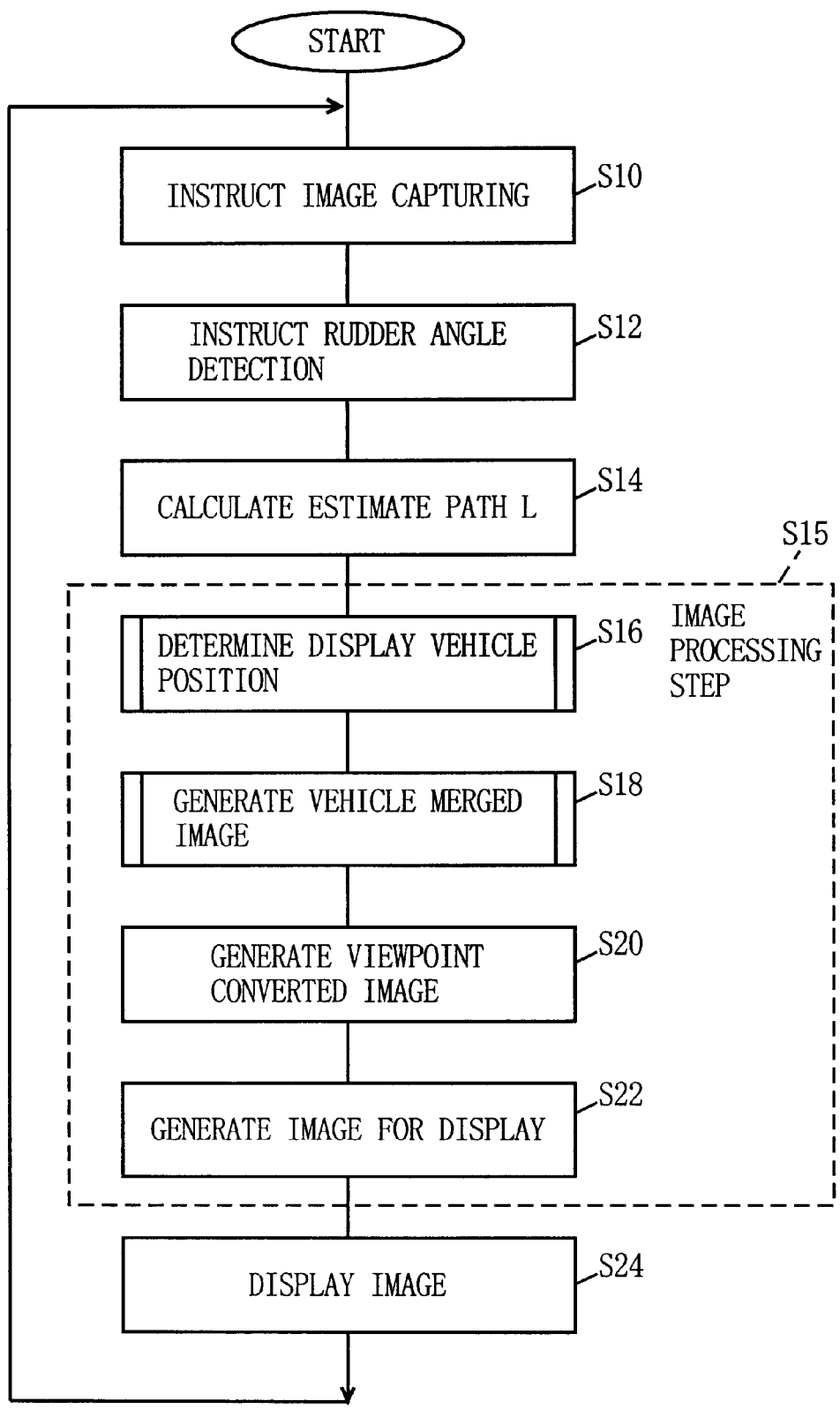
FIG. 2 is a flowchart showing the procedure for a CPU 6 of FIG. 1 to process.

To go through the procedure of FIG. 2, the CPU 6 needs any image of around the vehicle, specifically any image covering the area rear of the vehicle. Thus, the CPU 6 instructs at least one corresponding camera $2_i$ (where i=1, 2, . . . N) to capture an image (step S10). The camera $2_i$ then responsively captures a frame of an image of around the vehicle, and then transfers the captured image to the RAM 5. Here, presumably, the N cameras $2_1$ to $2_N$ each receive such instruction, and transfer an image captured thereby to the frame buffer reserved therefor.

After instructing the cameras as such, the CPU 6 runs as follows concurrently with the cameras' image capturing.

First, to estimate a path for the vehicle to take, the CPU 6 instructs the rudder angle sensor 3 to detect to what degree the steering wheel is now turned (step S12). The rudder angle sensor 3 accordingly detects the current rudder angle of the steering wheel, and transmits the detected result to the CPU 6.

Next, based on the result received from the rudder angle sensor 3, the CPU 6 calculates an estimated path L, which is typically traced on a road surface for the vehicle to take (step S14).

Figure 3:
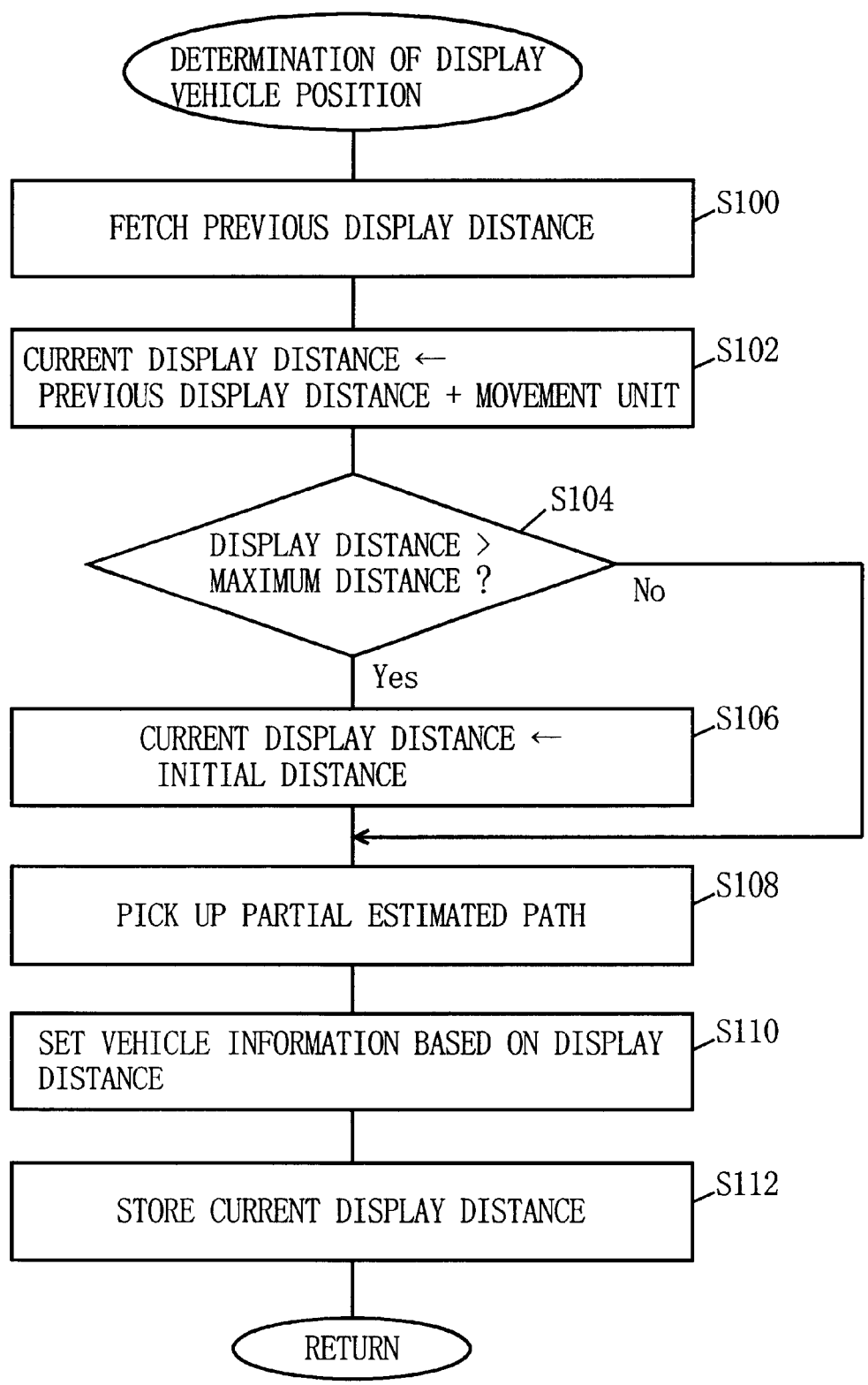
FIG. 3 is a flowchart showing the procedure to calculate a display position of a vehicle model (display vehicle position) in the embodiment.
Figure 6:
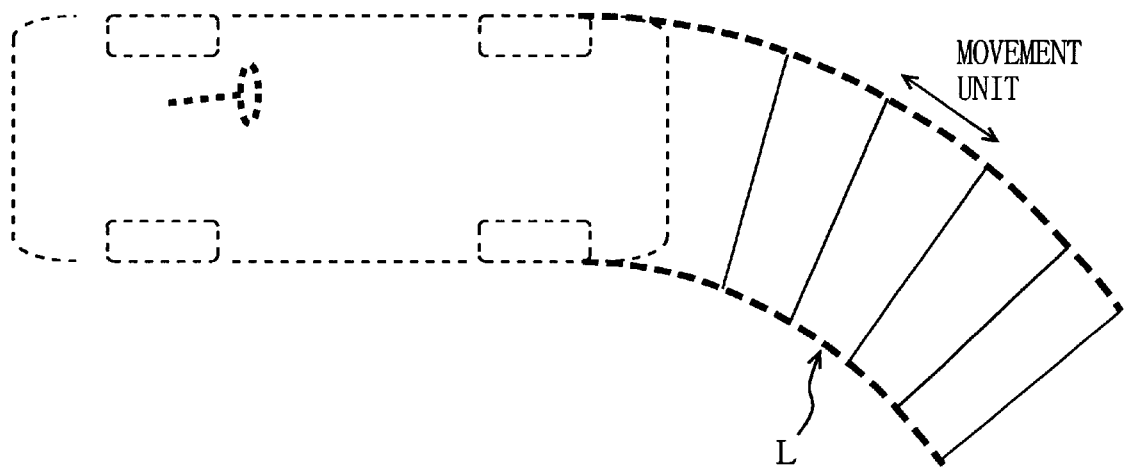
FIG. 6 is a diagram for illustrating the display vehicle position set in step S110 in FIG. 3.
Figure 7:
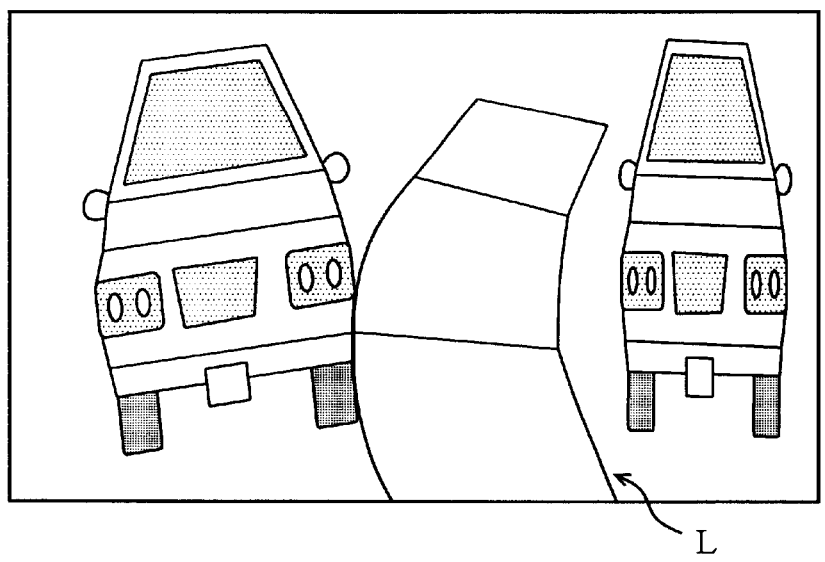
FIG. 7 is a diagram showing a display image in a conventional drive assistant device.

In the present embodiment, the drive assistant system 100 displays in a display image a vehicle model fully placed on the estimated path L. This is aimed to help the driver easily figure out any possible bump against vehicles and other objects if he/she keeps moving his/her vehicle with the current rudder angle on the estimated path L. In the display image, the vehicle model is displayed as if moving toward the parking space by degrees on the estimated path L (see FIG. 6). Here, the vehicle model keeps moving by a predetermined quantity (hereinafter, referred to as a movement unit). When the movement quantity of the vehicle model reaches its predetermined maximum value, the vehicle model returns to its predetermined initial position. For realization of such display, the CPU 6 carries out image processing of step S15 after step S14 is through. In the image processing, the CPU 6 first goes through such calculation procedure as shown in FIG. 3 to determine where to display the vehicle model on the estimated path L in the display image (step S16). Such position is hereinafter referred to as a display vehicle position.

Prior to describing the calculation procedure by referring to FIG. 3, terms to be mentioned below are described. First, a "display distance" denotes a distance (equivalent to a distance in the actual space) covered by the vehicle model on the estimated path L in the display image. The display distance is set to an initial distance first. Here, the "initial distance" denotes a first display position of the vehicle model. The initial distance is typically set to an appropriate value as are the movement unit and the maximum distance during when the drive assistant system 100 is manufactured. Here, the movement unit is exemplarily set to 0.5 m, and the maximum distance to 3 m. Those values are preferably resettable depending on the drivers' preferences.

When the procedure reaches step S16 of FIG. 2, the CPU 6 starts going through the calculation procedure of FIG. 3. First, the CPU 6 fetches the initial distance if this step is through for the first time, and if not, fetched is the display distance previously calculated in the same step (step S100). Thus fetched display distance is referred to as a previous display distance. Then, the previous display distance is added with the movement unit, and the resulting value is the current display distance (step S102). Then, the current display distance is determined whether or not exceeding the maximum value predetermined therefor (step S104). If exceeded, the current display distance is set to the initial distance (step S106), and then the procedure goes to step S108. If not yet exceeding, the procedure skips step S106, and goes to step S108. In step S108, the estimated path L calculated in step S14 is partially picked up for the length equivalent to the current display distance from the current position of the vehicle model. Here, such picked-up part of the estimated path L is referred to as a partial estimated path. As such, the display distance tells on which part of the estimated path L the vehicle model is now positioned (i.e., where the partial estimated path ends), and there, to which direction the estimated path L is directed (step S110) (see FIG. 6). Here, such position and direction of the vehicle model are equivalent to those in the actual space, and collectively referred to as vehicle information. Then, the current display distance is stored in the RAM 5 to be prepared for step S110 in the next calculation procedure (step S112).

After step S112 is through, the CPU 6 goes through such generation procedure as shown in FIG. 4 based on the vehicle information set in step S110 (step S18 in FIG. 2). An image generated thereby has the vehicle model overlaid thereon, and referred to as a vehicle merged image.

Specifically, the CPU 6 calculates a region to be occupied in the display image by the vehicle model, which is defined by position and direction according to the vehicle information set in step S110. Here, the region is equivalent to a region in the actual space (step S200). Then, the CPU 6 initializes to "1" a variable j specifying the identification values assigned to the cameras (step S202), and then sees if thus specified camera $2_j$ catches, presumably, a sight of the vehicle model occupying the region as calculated above (step S204). If determined No, the variable j is incremented by 1, and step S204 is repeated with the newly specified camera $2_j$. If the determination thereby becomes Yes, the vehicle model viewed from the camera $2_j$ is generated as a vehicle model image (step S206).

Next, the CPU 6 waits for the image captured by the camera $2_j$ to receive (step S208). By the time when the CPU 6 receives the image, the frame buffer in the RAM 5 for the camera $2_i$ (hereinafter, referred to as a target frame buffer) stores the same image. Thus, onto the image stored in the target frame buffer, the CPU 6 overlays the vehicle model image generated in step S206, and generates a frame of the vehicle merged image (step S210). Thereafter, the CPU 6 determines whether j>=N is satisfied, that is, whether all of the cameras $2_1$ to $2_N$ are subjected to the processing of step S204 (step S212). If j is determined as not yet being equal to N, the variable j is incremented by 1, and the procedure returns to step S204.

The processing of step S204 is repeatedly carried out to the remaining cameras until the variable j becomes equal to N (j=N). The CPU 6 then determines that the process of generating the vehicle overlaid image is now completed, and the procedure goes to step S20 in FIG. 2.

At this point in time, the frame buffers in the RAM 5 respectively reserved for the cameras $2_1$ to $2_N$ store either the vehicle overlaid image or the captured image. With respect to those images, the CPU 6 performs viewpoint conversion processing on the above-described frame memory according to a predetermined mapping table (step S20). The resulting image generated thereby is a viewpoint converted image, which shows the area around the vehicle viewed from a predetermined virtual viewpoint. Here, the virtual viewpoint is so selected as to make the resulting image viewed therefrom indicative enough for the driver to figure out in what state the area around the vehicle and the parking space is. The virtual viewpoint here is different from those for the cameras $2_1$ to $2_N$, and suitably selected to help the driver grasp the surrounding state between the vehicle and the parking space. Preferably, the virtual viewpoint is set proximal to the roof of the vehicle or up higher.

Here, as mentioned in the above, at least one frame buffer includes the vehicle overlaid image. Thus, the viewpoint converted image includes the vehicle model image viewed from the virtual viewpoint. In the present embodiment, as is conventionally done, every pixel in each of the images in the frame buffers (vehicle overlaid image and captured image) is mapped to a road surface whereon the vehicle moves, and the road surface is viewed from the virtual viewpoint to generate an image. Thus, any object observed in the resulting viewpoint converted image is neglected with its height component, and resultantly looks deformed. Here, the object includes other vehicle in a close range, the vehicle model itself, obstacle, and the like.

Figure 5A:
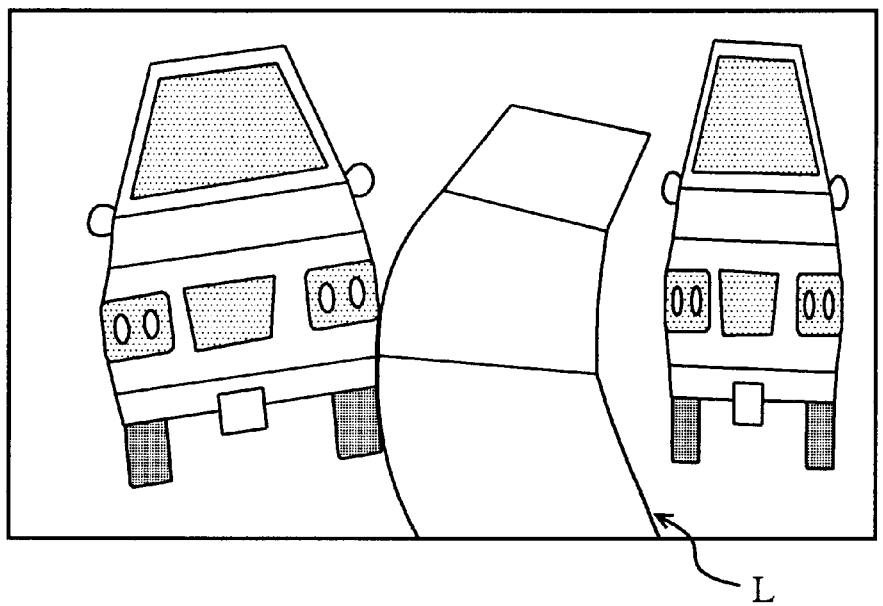
FIGS. 5a and 5b are diagrams showing one example of a display image displayed on a display device 8 of FIG. 1 without and with a vehicle model image thereon respectively.
Figure 5B:
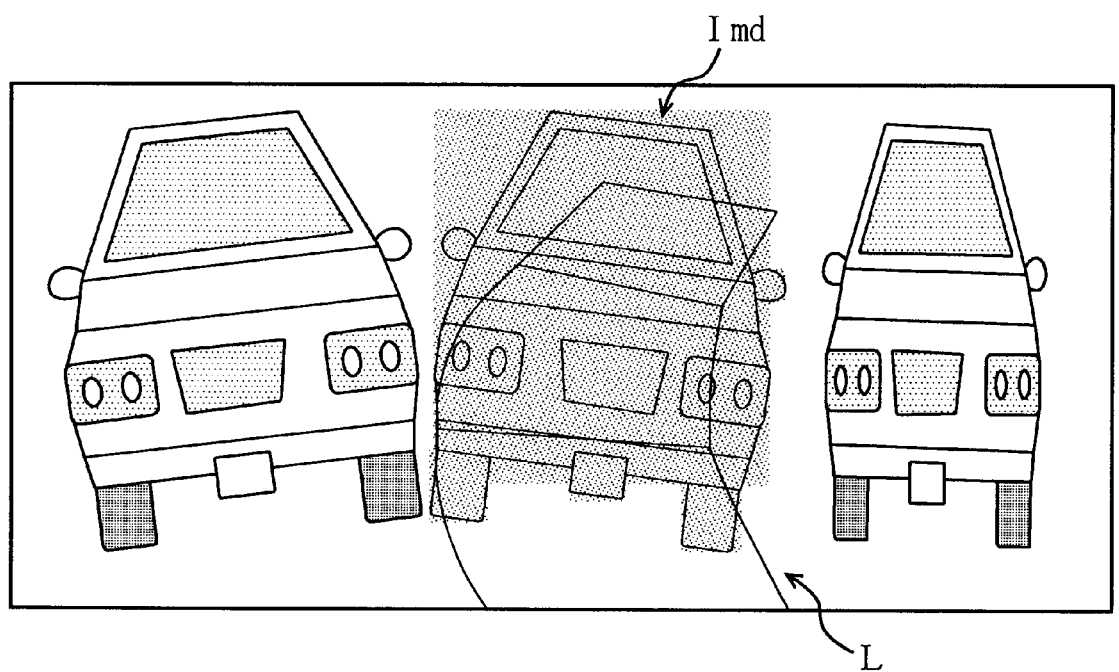

Then, the CPU 6 overlays the estimated path L calculated in step S14 onto the viewpoint converted image, and the display image is generated (step S22). The CPU 6 then transfers thus generated display image to the display device 8 for display thereon (step S24). As shown in FIG. 5B, the display image includes a vehicle model Imd located on the estimated path L. The vehicle model Imd moves backward on the estimated path L by the movement unit by repeating the processing in FIG. 2, and when the display distance reaches its predetermined value, returns to the initial distance.

As described in the foregoing, according to the present embodiment, a display image shows a vehicle model on a path estimated for the vehicle together with an area rear of the vehicle. With the help of such display image, a driver of the vehicle can exactly aim at a parking space available for his/her vehicle on estimated path. Also, the driver can precisely figure out if his/her vehicle can fit in the parking space. Here, in the display image, the vehicle model Imd is displayed as if moving backward on the estimated path L. Therefore, the driver can easily figure out only by seeing the display image whether or not the vehicle model Imd moving on the estimated path L hits any obstacle typified by other vehicle in a close range.

As described in the foregoing, if a viewpoint converted image is generated in the conventional manner, any object observed therein looks deformed as its height component is neglected. On the other hand, according to the present embodiment, even if any object such as other vehicle and obstacle appearing in the display image is deformed due to a merging map, the vehicle model also looks deformed. This is because, with the procedure of FIG. 4, a viewpoint converted image is generated based on a vehicle overlaid image which is generated by overlaying an image of the vehicle model viewed from the specified camera. As every object in the display image including the vehicle model itself is deformed, the driver can correctly figure out any possible bump against obstacles therearound. If the vehicle model is not deformed as other objects in the display image, the driver finds it difficult to measure an exact space between the vehicle model and the deformed obstacle.

Further, there is no more need for marking such as white lines defining an individual parking space. This is because, with the help of the display image showing the vehicle model moving on the estimated path L, the driver now can figure out whether his/her vehicle hits anything before fitting in the parking space.

Note that, in the above embodiment, the display image shows the vehicle model for the purpose of helping the driver to park. In some parking lots, however, an individual parking space is defined in a specific pattern (usually in a rectangular pattern) by white lines, for example. If so, the white lines are sufficient for the driver to recognize any available parking space, and thus the vehicle model is not considered essential in the display image, and only the estimated path will do. In such case, the CPU 6 may detect whether the specific pattern as above is observed in an area for where the vehicle is heading, and if detected, the vehicle model may not be displayed. Here, the detection technique as such is well known in this field. Also, not to display the vehicle model in the display image, step S210 of FIG. 4 may be skipped.

As described in the foregoing, to make sure that the vehicle does not hit any other vehicle in a close range, for example, the vehicle model may be set somewhat bigger than the actual vehicle.

Further, in the above, the vehicle is presumed to move backward to park. This is not restrictive, and the assistant device of the present invention is surely applicable to a case where the vehicle moves forward to park.

In the above embodiment, the program is stored in the ROM 5. This is not restrictive, and the program may be distributed in a recording medium typified by CD-ROM, or over a communications network such as the Internet.

Further, if the vehicle model is simply overlaid as in step S210, the vehicle model may partially hide the area ahead or rear of the vehicle in the display image. Therefore, the vehicle model may be translucent or wire-framed. In this manner, the display image generated by the rendering device 10 has no blind spot, and the drive thus can check the area front or rear of the vehicle to a greater degree. Especially in the case that the vehicle model is wire-framed, computation load can be reduced compared with the case where the vehicle image is simply rendered.

While the invention has been described in detail, the foregoing description is in all aspects illustrative and not restrictive. It is understood that numerous other modifications and variations can be devised without departing from the scope of the invention.

What is claimed is:

1. A rendering device for generating a display image of around a vehicle for drive assistance, comprising:

vehicle model storing means for storing a vehicle model representing said vehicle;

path calculating means for calculating an estimated path for said vehicle based on a rudder angle of the vehicle provided by rudder angle detecting means placed in the vehicle;

receiving means for receiving a captured image of around said vehicle from image capturing means placed in the vehicle; and image processing means for generating the display image based on said captured image, said estimated path, and said vehicle model, wherein the display image generated by said image processing means is displayed by display means placed in said vehicle, and includes said vehicle model arranged on said estimated path.

2. The rendering device according to claim 1, wherein said vehicle model is a 3D model, and said image processing means comprises:

vehicle position determining means for determining a display position on said estimated path for said vehicle model;

vehicle model image generating means for generating a vehicle model image by viewing the vehicle model stored in said vehicle model storing means from a viewpoint of said image capturing means; and vehicle merged image generating means for generating a vehicle merged image by overlaying said vehicle model image onto the captured image received by said receiving means, wherein said display image is generated based on said vehicle merged image.

3. The rendering device according to claim 2, wherein said image capturing means includes a plurality of cameras for capturing an image of around said vehicle from each viewpoint, and generating the captured image, said image processing means further includes viewpoint converted image generating means for generating a viewpoint converted image by viewing said vehicle and therearound from a predetermined virtual viewpoint, said vehicle merged image generating means generates the vehicle merged image based on the captured images received by said receiving means from said plurality of cameras, said viewpoint converted image generating means generates said viewpoint converted image based on the vehicle merged image generated by said vehicle merged image generating means, and said display image is generated based on said viewpoint converted image.

4. The rendering device according to claim 3, wherein said image processing means further includes display image generating means for generating the display image by overlaying said estimated path onto said viewpoint converted image.

5. The rendering device according to claim 1, further comprising specific pattern determining means for determining whether there is a specific pattern indicating a parking space available for said vehicle, wherein when said pattern determining means determines that there is said specific pattern, said image processing means generates the display image which does not include said vehicle model.

6. The rendering device according to claim 2, wherein said vehicle merged image generating means merges said vehicle model image which is translucent to the captured image received by said receiving means, and generates the vehicle merged image.

7. The rendering device according to claim 2, wherein said vehicle merged image generating means merges said vehicle model image which is wire-framed to the captured image received by said receiving means, and generates the vehicle merged image.

8. A rendering method for generating a display image of around a vehicle for drive assistance, wherein a vehicle model representing said vehicle is previously stored, and said method comprises the steps of:

a path calculation step of calculating an estimated path for said vehicle based on a rudder angle of the vehicle provided by rudder angle detecting means placed in the vehicle;

a reception step of receiving a captured image of around said vehicle from image capturing means placed in the vehicle; and an image processing step of generating the display image based on said captured image, said estimated path, and said vehicle model, wherein the display image generated in said image processing step is displayed by display means placed in said vehicle, and includes said vehicle model arranged on said estimated path.

9. According medium on which a program for generating a display image of around a vehicle for drive assistance is stored, wherein a vehicle model representing said vehicle is previously stored, and said program comprises the steps of:

a path calculation step of calculating an estimated path for said vehicle based on a rudder angle of the vehicle provided by rudder angle detecting means placed in the vehicle;

a reception step of receiving a captured image of around said vehicle from image capturing means placed in the vehicle; and an image processing step of generating the display image based on said captured image, said estimated path, and said vehicle model, wherein the display image generated in said image processing step is displayed by display means placed in said vehicle, and includes said vehicle model arranged on said estimated path.

10. A program for generating a display image of around a vehicle for drive assistance, wherein a vehicle model representing said vehicle is previously stored, and said program comprises the steps of:

a path calculation step of calculating an estimated path for said vehicle based on a rudder angle of the vehicle provided by rudder angle detecting means placed in the vehicle;

a reception step of receiving a captured image of around said vehicle from image capturing means placed in the vehicle; and an image processing step of generating the display image based on said captured image, said estimated path, and said vehicle model, wherein the display image generated in said image processing step is displayed by display means placed in said vehicle, and includes said vehicle model arranged on said estimated path.

* * * * *